United States Patent [19]
DeMarco

[11] Patent Number: 5,550,610
[45] Date of Patent: Aug. 27, 1996

[54] SYSTEM FOR CREATING SPECIAL EFFECT IMAGES IN THE OUT-OF-FOCUS HIGHLIGHTS OF PHOTOGRAPHS

[76] Inventor: Frank G. DeMarco, 36 E. 7th St. #2W, New York, N.Y. 10003

[21] Appl. No.: 513,173

[22] Filed: Aug. 9, 1995

[51] Int. Cl.[6] .................................................. G03B 11/00
[52] U.S. Cl. ...................................... 354/295; 354/296
[58] Field of Search ................................. 354/295, 296

[56] References Cited

U.S. PATENT DOCUMENTS

| | | |
|---|---|---|
| H654 | 7/1989 | Doyle et al. . |
| 2,504,255 | 4/1950 | Lanauze . |
| 2,641,952 | 6/1953 | Mellert . |
| 3,122,077 | 2/1964 | Splendore . |
| 3,774,992 | 11/1973 | Steiner . |
| 3,885,242 | 5/1975 | Duran . |
| 3,918,078 | 11/1975 | Savage . |
| 4,124,859 | 11/1978 | Huber . |
| 4,126,878 | 11/1978 | Steiner . |
| 4,416,528 | 11/1983 | Breslau . |
| 4,894,671 | 1/1990 | Wheeler . |
| 4,896,176 | 1/1990 | Barrett . |
| 5,144,348 | 9/1992 | Disanzo et al. . |
| 5,233,375 | 8/1993 | Williams et al. . |

*Primary Examiner*—Monroe H. Hayes
*Attorney, Agent, or Firm*—Dorr, Carson, Sloan & Birney, P.C.

[57] ABSTRACT

A camera system creates special effect images in the out-of-focus highlights of a photographic image by inserting a transparent image cell between the objective lens and focal plane of the camera. The image cell can be a transparency bearing the desired special effect image. Alternatively, the image cell can be a transparent liquid crystal display (LCD) to provide either still or animated special effect images. The special effect image appears in any out-of-focus highlights (e.g., background street lights or headlights) in the photographic image, but does not otherwise affect the appearance of the photograph. The image cell is held by a tubular housing having connectors at each end to removably engage the standard connectors on the camera body and objective lens. The image cell can be held in a fixed optical position within the housing, for example, by means of a slide or a gate with spring clips. Alternatively, the image cell housing can include an image cell holder that allows rotation or translation of the image cell along the optical axis between the objective lens and camera. The image cell holder can also include a plurality of slots for holding the image cell at any of a corresponding plurality of positions along the optical axis. This allows the user to readily rotate or adjust the size of the special effect image or superimpose a number of special effect images.

20 Claims, 6 Drawing Sheets

SYSTEM FOR CREATING SPECIAL EFFECT IMAGES IN THE OUT-OF-FOCUS HIGHLIGHTS OF PHOTOGRAPHS

BACKGROUND OF THE INVENTION

1. Field of the Invention

The present invention relates generally to the field of photography. More specifically, the present invention discloses a camera system for creating special effect images in the out-of-focus highlights of photographs.

2. Statement of the Problem

A wide variety of special effects have been used for many years in photographs and motion pictures. It is important for the photographer to be able to control, alter, or manipulate the photographic image for practical as well as artistic and aesthetic reasons. In particular, there is a need to incorporate special effects in a photographic image to attract the viewer's attention or interest. For example, advertisers want their logos to be seen and recognized in a subtle, artful, pleasing, and novel manner.

Prior Art—Photographic Filters

Photographic filters have long been used to create a variety of special effects. Filters are perhaps most commonly used to correct the color balance of the ambient light to that of the imaging medium. For example, when using daylight-balanced slide film, the photographer must use an 80 A blue filter when shooting indoors under 3200° K tungsten lighting. In black-and-white photography, a red filter is often used to darken the sky and make clouds more pronounced. Graduated filters can also be used to darken a bright sky while leaving the lower portion of the image unchanged. Star filters are used to create a star burst or sun ray effect on the highlights of a photographic image. A piece of net or stocking in front of the lens can be employed to accomplish similar special effects in the highlights of a photograph. A net or stocking also tends to soften or blur the highlights. However, neither of these approaches creates coherent special effect images in the out-of-focus areas.

Several lenses and adapters allow a filter to be inserted between the objective lens and the camera. For example, the adapter used to attach a Nikon™ still camera lens to an Aaton™ 16 mm motion picture camera allows a color-correction or light attenuation gel to be placed over the rear aperture of the adapter. Some large telephoto lenses for Nikon™ and Canon™ cameras allow a filter to be screwed onto threads at the rear of the lens before the lens is mounted to the camera body. Other lenses include an intra-lens slot that accepts nets, gels, or glass filters. Some allow the filter to be dropped directly into the slot, while others must have the filter premounted on a filter-holding stage that can be inserted into the slot. Some video cameras include an internal disk with various color-correcting and/or light-attenuating filters that are rotated into place in front of the image plane via an external wheel, knob, or lever. A specific example of this is the Sony™ BVW400A Beta camera/recorder. However, none of these approaches are capable of creating coherent special effect images in the out-of-focus highlights of a photograph.

Prior Art—Masking and Matte Boxes

Matte boxes and masking techniques have long been used to fix the shape or outline of the whole picture (e.g., to create keyhole, binocular, or split screen effects). This can be accomplished by mounting a matte box or mask in front of or behind the camera lens. A number of prior art patents in this field include the following:

| Inventor | Patent No. | Issue Date |
|---|---|---|
| Lanauze | 2,504,255 | Apr. 18, 1950 |
| Mellert | 2,641,952 | June 16, 1953 |
| Splendore | 3,122,077 | Feb. 25, 1964 |
| Savage | 3,918,078 | Nov. 4, 1975 |
| Williams et al. | 5,233,375 | Aug. 3, 1993 |

Lanauze discloses a behind-the-lens filter and mask (column 3, lines 16–25). The mask serves as a means for controlling the outline or matting of the image recorded on film (e.g., a keyhole image).

The Mellert and Savage patents disclose other examples of devices for matting a photographic image (e.g., FIG. 9 and column 4, line 69, through column 5, line 9, of the Mellert patent).

Some cameras are equipped with a variable shutter feature that allows in-camera fades and dissolves. These special effects generally change the shape of the whole picture similar to a mask. In contrast, the present invention places a selected special effect image inside the out-of-focus highlights without changing the shape of the picture.

Prior Art—Inadvertent Lens Distortions

A number of prior art lenses with internal f-stop irises inadvertently change the size and shape of the out-of-focus highlights in a photograph. For example, the Zeiss™ 10-1 T2 Zoom lens creates pentagonal out-of-focus highlights that correspond to the shape of the pentagonal iris in this lens. Other lenses create hexagonal, octagonal, or nonagonal out-of-focus highlights. The iris changes the shape of the out-of-focus highlights, but cannot create coherent special effect images within the out-of-focus highlights. Additionally, the iris shape is a fixed characteristic of the lens design. The size of the aperture is a function of the f-stop chosen by the photographer in response to ambient light conditions in any given photographic situation.

Anamorphic lenses can also inadvertently create elliptical out-of-focus highlights in photographs. Here again, the size and shape of the elliptical highlights are fixed characteristics of the lens design. This approach cannot be used to create arbitrary, coherent special effect images.

3. Solution to the Problem

None of the prior art references uncovered in the search show a camera system for creating a selected coherent special effect image in the out-of-focus highlights of a photograph by interposing a transparent image cell between the objective lens and focal plane of a camera. The image cell is positioned along the optical axis of the camera to create the desired special effect image without otherwise affecting the photographic image.

SUMMARY OF THE INVENTION

This invention provides a camera system for creating special effect images in the out-of-focus highlights of a photographic image by inserting a transparent image cell between the objective lens and focal plane of the camera. The image cell can be a transparency bearing the desired special effect image. Alternatively, the image cell can be a transparent liquid crystal display (LCD) to provide either still or animated special effect images. The special effect image appears in any out-of-focus highlights (e.g., background street lights or headlights) in the photographic image, but does not otherwise affect the appearance of the photograph. The image cell is held by a tubular housing having connectors at each end to removably engage the standard connectors on the camera body and objective lens.

The image cell can be held in a fixed optical position within the housing, for example, by means of a slide or a gate with spring clips. Alternatively, the image cell housing can include an image cell holder that allows rotation or translation of the image cell along the optical axis between the objective lens and camera. The image cell holder can also include a plurality of slots for holding the image cell at any of a corresponding plurality of positions along the optical axis. This allows the user to readily rotate or adjust the size of the special effect image or superimpose a number of special effect images.

A primary object of the present invention is to provide a system for creating arbitrary special effects images in the out-of-focus highlights of a photograph.

Another object of the present invention is to provide a special effects system that can be readily adapted to conventional still cameras, video cameras, and motion picture cameras.

Yet another object of the present invention is to provide a system for creating either still or animated special effects images, as well as permitting rotation and adjustment in the size of the special effects images.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
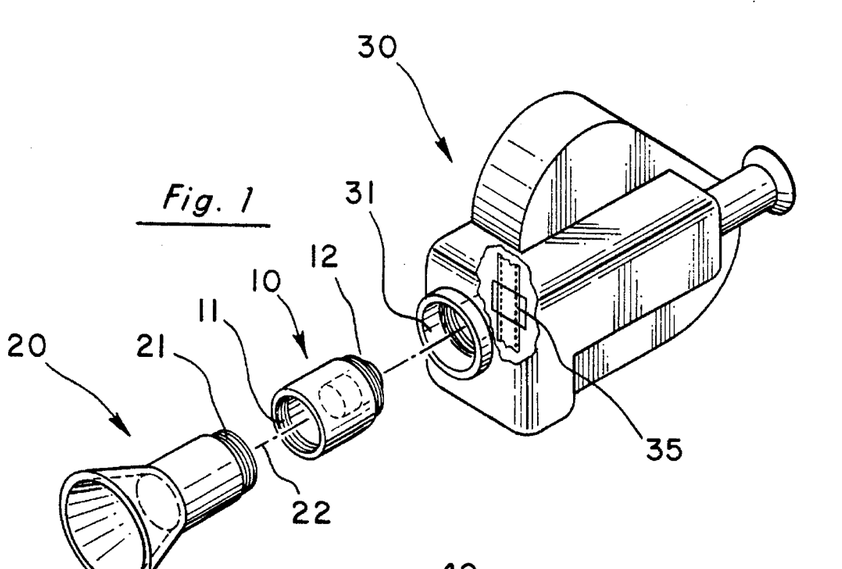
FIG. 1 is an exploded view of the entire camera assembly.

Turning to FIG. 1, an exploded view is provided of the entire camera assembly. An objective lens 20 projects a photographic image along its optical axis 22 toward the focal plane 35 of the camera 30. A substantially tubular holder 10 extends along the optical axis 22 between the objective lens 20 and the camera 30. This tubular holder 10 is used to support an image cell 15 perpendicular to the optical axis 22 between the objective lens 20 and the camera 30. The holder 10 and its connections with the objective lens 20 and camera 30 should be light-tight so that stray light does not degrade the photographic image recorded by the camera 30.

Figure 13:
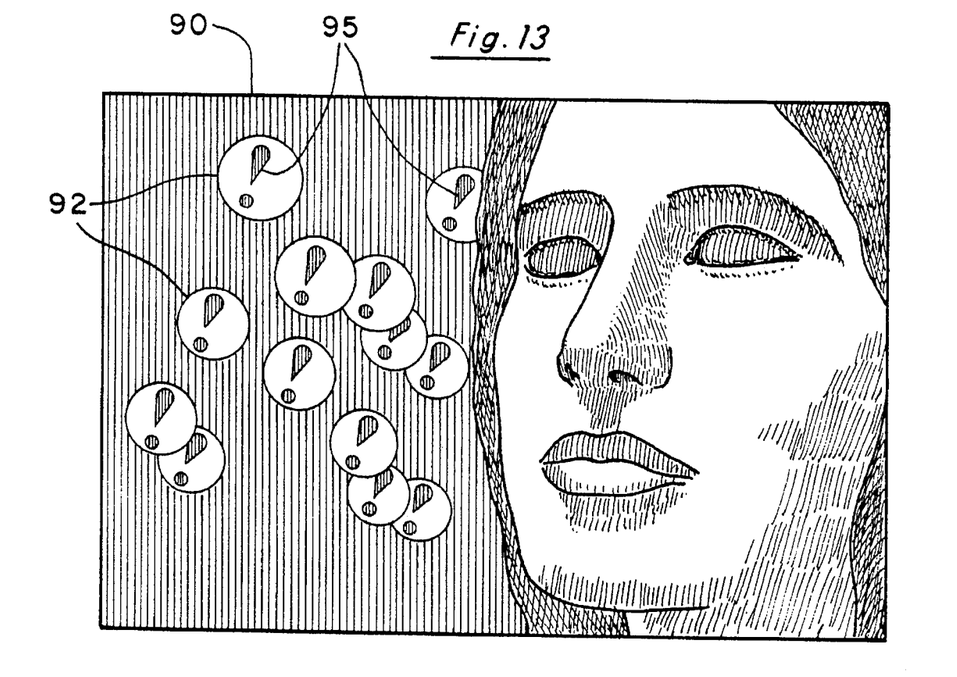
FIG. 13 is an example of a photograph 90 created using the present invention with special effect images 95 in the out-of-focus highlights 92.
Figure 14:
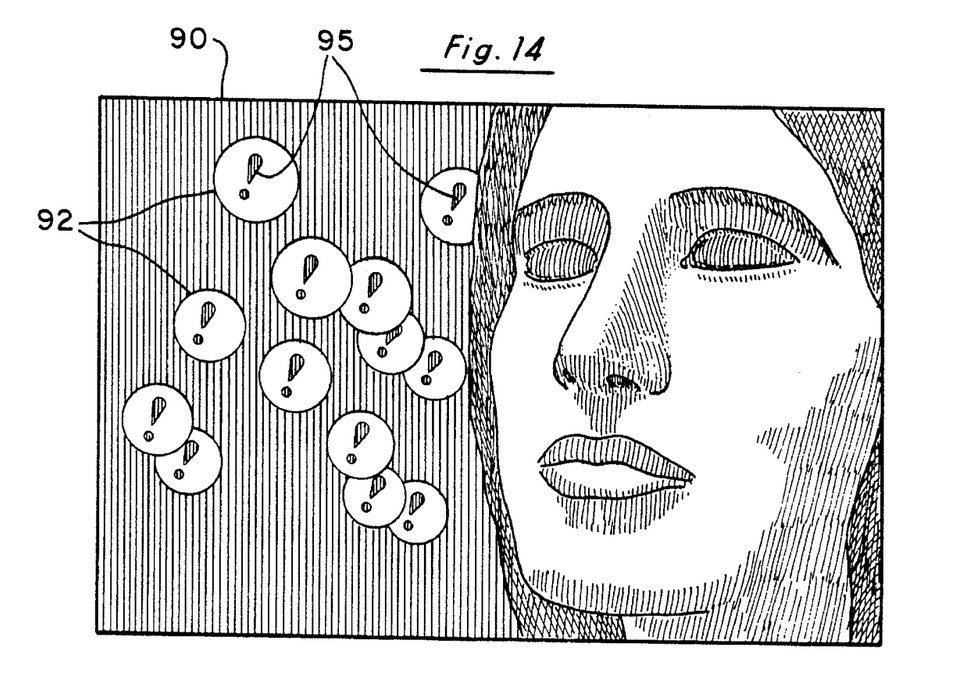
FIG. 14 is another example of a photograph created using the present invention in which the image cell has been moved further from the film plane of the camera to produce smaller special effect images 95 in the out-of-focus highlights 92 of the photograph 90.

The objective lens 20 is focused in the conventional manner so that at least a portion of the photographic image recorded by the camera 30 contains out-of-focus highlights 92 within the field of view, as shown for example in FIGS. 13 and 14. For example, out-of-focus highlights 92 can result from street lights, headlights, sunlight, or bright reflections in the out-of-focus background and/or foreground of the photograph. These out-of-focus highlights 92 would normally appear in a conventional photograph as bright circles, ellipses, polygons, or rounded blobs of light. The camera 30 can be a conventional still camera, video camera, motion picture camera, or any other means for recording photographic images.

Figures 2, 3:
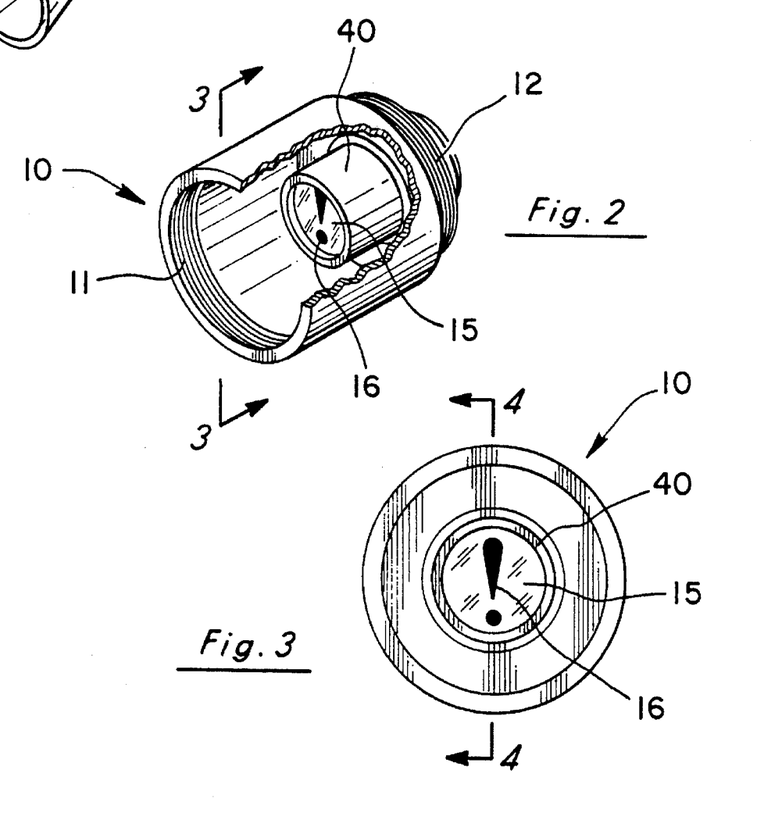
FIG. 2 is a front perspective view of the image cell housing 10 with a portion of the holder wall cut away to reveal the image cell 15 and the image cell holder 40 within the housing 10.
FIG. 3 is a front view of the image cell housing 10.

In the embodiment shown in FIGS. 2 and 3, the image cell 15 is a transparency bearing the desired special effect image 16. The image cell 15 can be made of any transparent medium, such as glass or acetate. The special effect image 16 is usually a black-and-white image defined by corresponding opaque and transparent regions in the image cell 15. However, the special effect image 16 can also include gray-scale images or color. The image cell 15 shown in the accompanying drawings shows an exclamation point as the special effect image 16. However, virtually any coherent image could be substituted, such as company logos, symbols, faces, or geometric designs or shapes. The special effect image can also include alphanumeric data, such as words, letters, date, time, brand names, etc.

The scene projected by the objective lens 20 passes through the image cell 15 onto the focal plane 35 of the camera 30 where the resulting photographic image is recorded electronically or on film. The position of the image cell along the optical axis 22 between the objective lens and camera's focal plane is adjusted to create special effect images 95 within any out-of-focus highlights 92 in the photographic image 90 as shown in the examples provided in FIGS. 13 and 14. This typically requires manual adjustment of the position of the image cell 15 until the special effect image 95 appears in the out-of-focus highlights 92 of the photographic image. The special effect image 95 appears only within the out-of-focus highlights 92 of the photographic image 90 recorded by the camera. Unlike the prior art involving mattes or masks, the image cell 15 in the present invention is held far enough away from the focal plane 35 of the camera 30 so that there is no shadow problem and minimal image degradation.

Many cameras and lenses include connectors 21, 31 for removably mounting the lens 20 to the camera body 30. This allows a wide variety of lenses to be used interchangeably with the camera. As shown in FIGS. 1 and 2, the image cell housing 10 can be equipped with a first connector 11 for removably engaging the lens connector 21 and a second connector 12 for removably engaging the camera connector 31. These connectors permit the image cell housing 10 to be quickly and easily attached between the objective lens 20 and the camera body 30. The embodiment depicted in FIGS. 1, 2, and 4 uses threads as the connectors 11 and 12. It should be expressly understood that other types of connectors could be readily substituted. For example, many types of cameras use a variety of bayonet-mount connectors to attach interchangeable objective lenses to the camera body. Camera manufacturers use different types of connectors to differentiate their respective families of products. Any of these types of connectors could be substituted at either end of the image cell housing 10 to allow the housing to be inserted between the objective lens 20 and the camera body 30 as illustrated in FIG. 1.

Figure 4:
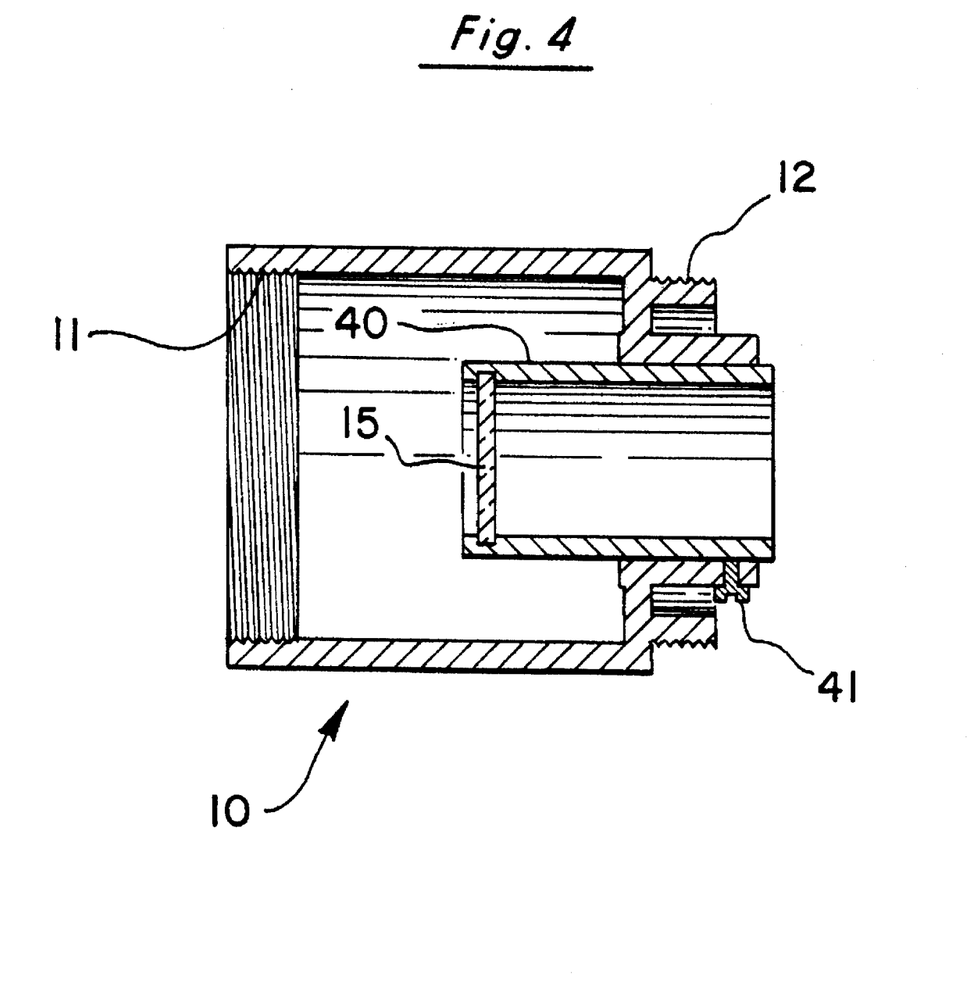
FIG. 4 is side cross-sectional view of the image cell housing 10 corresponding to FIG. 2.

FIGS. 2 through 4 show an embodiment of the image cell housing 10 in which the position of the image cell 15 along the optical axis can be manually adjusted by sliding or rotating the image cell holder 40 relative to the housing 10. The image cell holder 40 is substantially tubular and passes through an aperture in the rear wall of the housing 10 as illustrated in FIG. 2. The diameter of the image cell holder 40 and the diameter of the aperture in the rear wall of the housing 10 are selected so that the image cell holder 40 can slide or rotate relative to the holder 40 without admitting stray light that might degrade the photograph. The user can freely adjust the position or angular orientation of the image cell 15 along the optical axis by sliding or rotating the image cell holder 40 relative to the housing 10, without otherwise changing the focus or other optical characteristics of the camera assembly due to the fixed length of the image cell housing 10. Once the desired position for the image cell has been achieved, a set screw 41 is tightened to secure the image cell holder 40 to the housing 10. Alternatively, the set screw 41 could be replaced with a spring-plunger mechanism that selectively engages one of a series of ribs or detents in the surface of the image cell holder 40 to secure the image cell holder 40 to the housing 10. Other equivalent fastening means could be readily substituted. The image cell holder 40 and housing can also be equipped with complementary threads so that the position and orientation of the holder 40 can be adjusted by turning the holder 40 relative to the housing 10.

Figure 5:
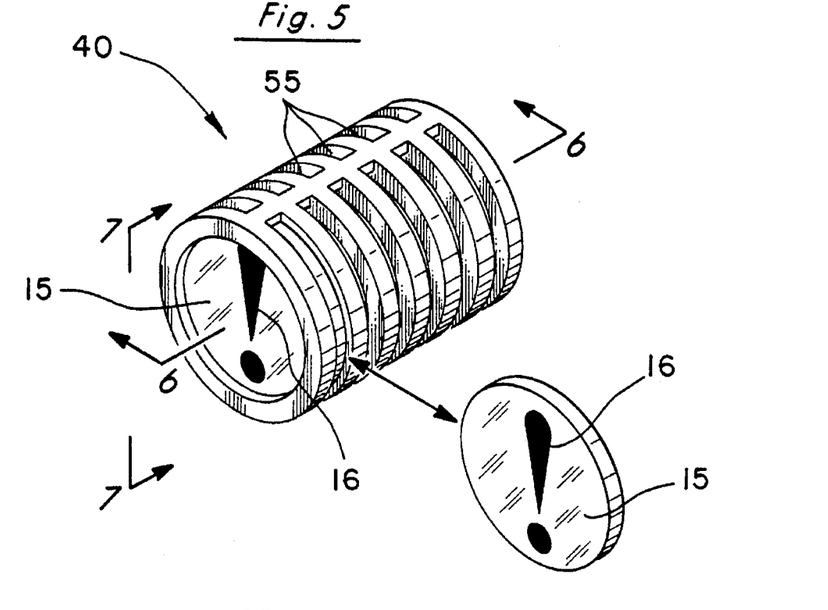
FIG. 5 is a front perspective view of an alternative embodiment of the image cell holder 40 having a plurality of slots 55 for receiving the image cell 15.
Figure 6:
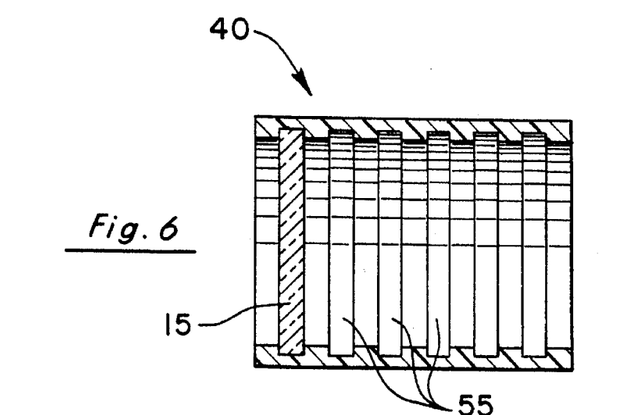
FIG. 6 is a side view of the image cell holder 40 and image cell 15 corresponding to FIG. 5.
Figure 7:
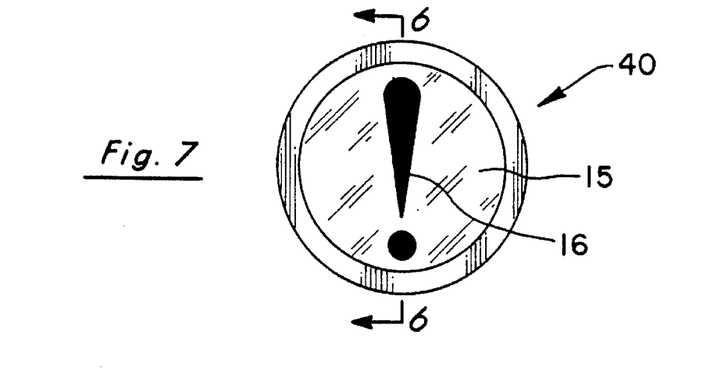
FIG. 7 is a front view of the image cell holder 40 and image cell 15 corresponding to FIG. 5.

FIGS. 5 through 7 illustrate an alternative embodiment in which the image cell holder 40 contains a series of slots 55 for holding the image cell 15 at any of a plurality of positions along the optical axis of the camera assembly. This allows several special effect images to be combined by stacking a plurality of image cells 15 in different slots 55. The resulting special effect image will then be a composite of the images in each of the image cells 15. This embodiment also permits the user to adjust the size of the special effect image 95 by changing the position of the image cell 15 along the optical axis of the camera. The resulting special effect image 95 in the photograph 90 decreases in size as the image cell 15 is moved toward the objective lens 20 and away from the focal plane 35 of the camera 30, as shown in FIG. 14 compared to FIG. 13. The image cell holder 40 also allows rotation of the image cell 15 relative to the camera. This results in apparent rotation of the special effect image 95 in the out-of-focus highlights 92.

Figure 8:
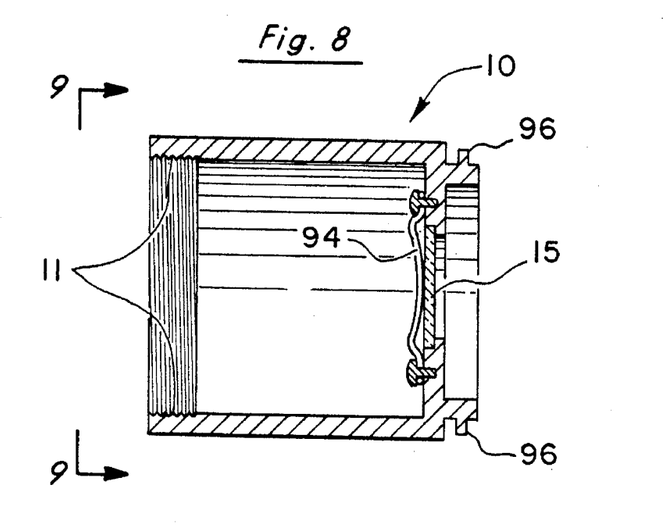
FIG. 8 is a side cross-sectional view of an alternative embodiment of the image cell housing 10 using retaining clips 94 to hold the image cell 15.
Figure 9:
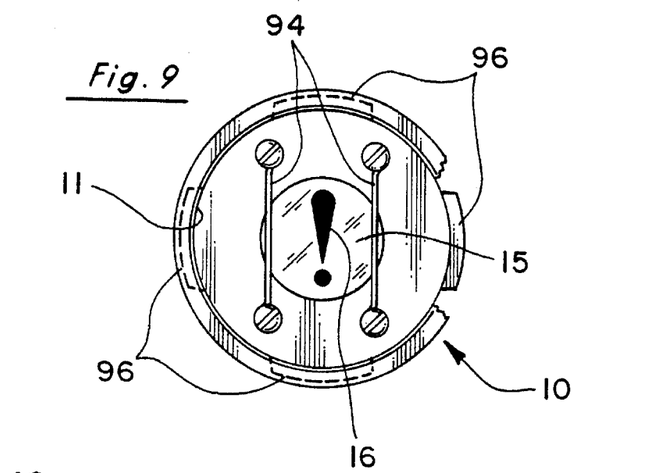
FIG. 9 is a front view of the image cell housing 10 corresponding to FIG. 8.
Figure 10:
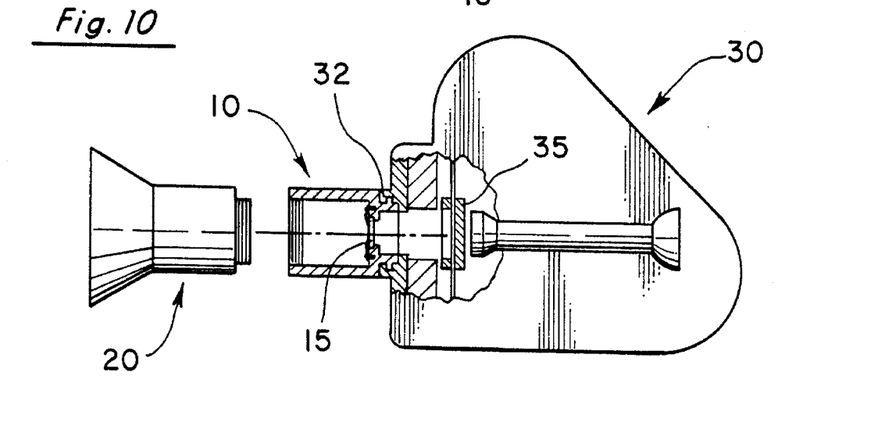
FIG. 10 is a simplified cross-sectional view of the entire camera assembly using the alternative embodiment of the image cell housing 10 illustrated in FIG. 8.

FIGS. 8 through 10 depict an alternative embodiment of the image cell housing 10 in which the image cell 15 is held in a fixed position along the optical axis by two wire retaining clips 94. The clips 94 act as springs exerting a force to hold the image cell 15 in place over the aperture in the rear wall of the holder 10, shown in the side cross-sectional view in FIG. 8. FIG. 9 shows a corresponding front view of the image cell housing 10. This embodiment allows rotation of the special effect image by manually rotating the image cell 15 beneath the clips 94. The housing 10 illustrated in FIGS. 8 through 10 employs a series of flanges 96 to attach the housing 10 to the camera body 30. The flanges 96 engage the positive-locking mount mechanism 32 of the camera 30, as shown in FIG. 10, and enable the housing to be quickly interchanged.

Figure 12:
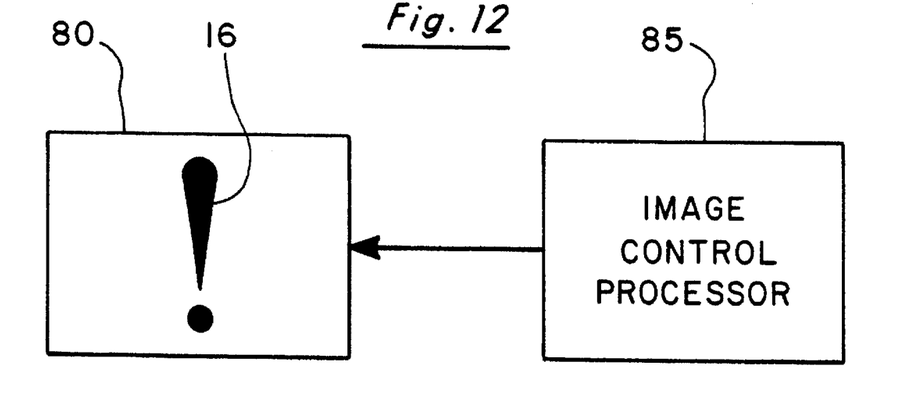
FIG. 12 is a block diagram of an alternative embodiment in which the image cell is a transparent liquid crystal display (LCD) 80 controlled by an image control processor 85 to produce either still or animated special effect images.

A transparent liquid crystal display (LCD) 80 can be used as the image cell 15 to create either still or animated special effect images, as depicted in FIG. 12. For example, the LCD 80 can be used to resize, rotate, or move the special effect image. The LCD 80 consists of a two-dimensional grid of pixels, each of which can be switched between an opaque state and a transparent state by an external image control processor 85. This enables the processor 85 to create images on the LCD 80 by switching the appropriate pixels to their opaque state. The LCD 80 is capable of rapidly displaying a series of special effect images 16 under the control of the processor 85 to create the illusion of animation. The LCD 80 should be synchronized with operation of the camera shutter so that the appropriate special effect image is displayed as each frame is exposed by the camera.

Figure 11:
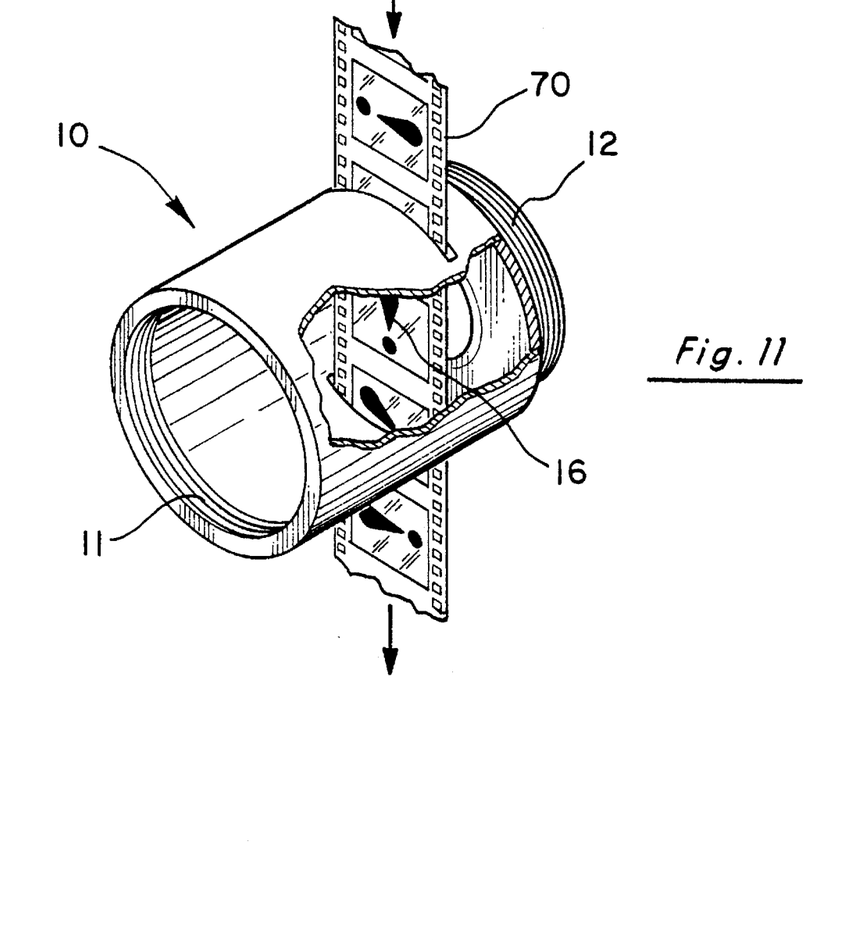
FIG. 11 is a front perspective view of an alternative embodiment in which the image cell uses a length of film 70 containing a series of special effect images. The special effect frames are synchronously transported through the holder 10 as photographic images are recorded by the camera to create an animated special effect image.

Animated special effects can also be created using a length of film (e.g., movie film) 70 containing a plurality of frames defining a time-sequence of special effect images 16 as illustrated in FIG. 11. The frames of the special effects film 70 are transported synchronously through the holder 10 as photographic images are recorded by the camera 30 to create animated special effect images within the out-of-focus highlights of the photographs.

The present invention has a number of possible fields of use. For example, the device can be used to create novel aesthetic or artistic effects in the out-of-focus highlights of a photograph, television image, or movie image. The present invention provides a subtle, yet effective, means for attracting the viewer's attention to the special effect image. The device can also be used by advertisers to place images of their trademarks or products in the out-of-focus highlights of a photographic image. The present invention could also be used for law enforcement or security purposes to embed date and/or time information into photographs in such a complex way as to make tampering extremely difficult.

The above disclosure sets forth a number of embodiments of the present invention. Other arrangements or embodiments, not precisely set forth, could be practiced under the teachings of the present invention and as set forth in the following claims.

I claim:

1. A system for creating special effect images in the out-of-focus highlights of a photographic image, said system comprising:

an objective lens;

a camera for recording a photographic image projected through said objective lens onto a predetermined focal plane, with at least a portion of said photographic image having highlights that are out of focus; and an image cell having transparent portions and opaque portions defining a predetermined special effect image, said image cell being placed between said objective lens and said focal plane to create said special effect image within said out-of-focus highlights in said photographic image.

2. The system of claim 1 wherein said image cell is a transparency bearing said special effect image.

3. The system of claim 1 wherein said image cell comprises a transparent liquid crystal display (LCD) for creating an animated special effect image.

4. The system of claim 1 wherein said image cell comprises:

a length of film containing a plurality of flames defining a time-sequence of special effect images; and means for transporting said film through said image cell as photographic images are recorded by said camera to create an animated special effect image within said out-of-focus highlights.

5. The system of claim 1 further comprising a housing for mounting said image cell between said objective lens and said camera.

6. The system of claim 5 wherein said housing further comprises a plurality of slots for holding said image cell at any of a corresponding plurality of positions between said objective lens and said camera.

7. The system of claim 5 wherein said objective lens includes a connector and said camera includes a connector for removably engaging said objective lens connector to removably mount said objective lens to said camera, and wherein said housing further comprises a first connector for removably engaging said objective lens connector and a second connector for removably engaging said camera connector.

8. The system of claim 5 wherein said housing further comprises a slidable holder for holding said image cell at any of a corresponding plurality of positions between said objective lens and said camera.

9. The system of claim 5 wherein said housing further comprises a movable holder for holding said image cell at any of a range of positions within said housing.

10. The system of claim 9 wherein said housing further comprises means for securing said image cell holder at a desired position relative to said housing.

11. The system of claim 1 further comprising means for rotating said image cell relative to said camera.

12. A system for creating special effect images in the out-of-focus highlights of a photographic image for use primarily in conjunction with a camera having a removable objective lens for projecting a photographic image onto a predetermined focal plane within said camera with at least a portion of said photographic image having highlights that are out of focus; said camera and said objective lens each having complementary connectors for removably securing said objective lens to said camera, said special effect system comprising:

a housing having a first end and a second end;

a first connector at said first end of said holder for removably engaging said connector of said objective lens;

a second connector at said second end of said holder for removably engaging said camera connector; and an image cell having transparent portions and opaque portions defining a predetermined special effect image, said image cell being held at a position within said housing to create said special effect image within said out-of-focus highlights in said photographic image.

13. The system of claim 12, wherein said image cell is a transparency bearing said special effect image.

14. The system of claim 12, wherein said image cell comprises a transparent liquid crystal display (LCD) for creating an animated special effect image.

15. The system of claim 12, wherein said housing further comprises a plurality of slots for holding said image cell at any of a corresponding plurality of positions between said objective lens and said camera.

16. A system for creating special effect images in the out-of-focus highlights of a photographic image, said system comprising:

an objective lens for projecting a photographic image along a optical axis;

a camera for recording said photographic image projected by said objective lens with at least a portion of said photographic image having highlights that are out of focus;

a housing extending along said optical axis between said objective lens and said camera; and an image cell having transparent portions and opaque portions defining a predetermined special effect image, said image cell being held by said housing at a position along said optical axis to create said special effect image within said out-of-focus highlights in said photographic image recorded by said camera.

17. The system of claim 16 wherein said image cell is a transparency bearing said special effect image.

18. The system of claim 16 wherein said image cell comprises a transparent liquid crystal display (LCD) for creating an animated special effect image.

19. The system of claim 16 wherein said houisng further comprises a plurality of slots for holding said image cell at any of a corresponding plurality of positions along said optical axis.

20. The system of claim 16 wherein said objective lens and said camera include connectors for removably mounting said objective lens to said camera, and wherein said housing further comprises a first connector for removably engaging said objective lens connector and a second connector for removably engaging said camera connector.

* * * * *